United States Patent [19]

Saunders

[11] 4,082,377
[45] Apr. 4, 1978

[54] AXLE CRADLE MOUNTING HAVING ELASTOMERIC SPHERICAL BUSHINGS

[75] Inventor: Lawrence Allan Saunders, Stratford, Canada

[73] Assignee: Clark Equipment Company, Buchanan, Mich.

[21] Appl. No.: 726,329

[22] Filed: Sep. 24, 1976

[51] Int. Cl.² ............................................. F16C 27/02
[52] U.S. Cl. .................................. 308/15; 301/124 R
[58] Field of Search ....................... 308/15, 16, 26, 27, 308/28, 124 R, 137, 190, 238, 239; 301/124 R, 124 H, 129, 132, 135

[56] References Cited

U.S. PATENT DOCUMENTS

| | | | |
|---|---|---|---|
| 2,305,880 | 12/1942 | Leighton | 403/75 |
| 2,996,308 | 8/1961 | Cislos | 280/96.1 |
| 3,131,978 | 5/1964 | White | 308/238 |
| 3,563,619 | 2/1971 | Evans | 308/15 |

*Primary Examiner*—Duane A. Reger
*Attorney, Agent, or Firm*—Harry G. Thibault

[57] ABSTRACT

Mounting means for a cradle assembly carrying the front axle of a vehicle. An articulated vehicle, having a front frame and a rear frame, includes a cradle assembly secured to the front frame for supporting the power-driven front axle of the vehicle. The mounting means for the cradle assembly comprises mounting blocks, coaxially aligned, provided at respective front and rear ends of the front frame. Provided at opposite ends of the cradle assembly are respective tapered mounting pins coaxially aligned. Mutually aligned spherical bushings carried on the outer ends of the mounting pins are received in the mounting blocks of the front frame. Each bushing comprises a cylindrical outer race having a spherical inner core which receives a spherical inner race therein. Bonded to the inner race of the bushing is an elastomeric material which is also bonded to the outer race of the bushing, the elastomeric material permitting oscillation of the inner race relative to the outer race, thus allowing four-wheel contact of the vehicle with the ground in the normal working mode. The elastomeric bearing also provides damping means for forces transmitted through each joint which produces a progressively higher resistance moment as cradle movement is increased. Further the elastomeric interface of the bearing seals the joint against contaminants.

6 Claims, 7 Drawing Figures

AXLE CRADLE MOUNTING HAVING ELASTOMERIC SPHERICAL BUSHINGS

BACKGROUND OF THE INVENTION

1. Field of the Invention

This invention pertains to articulated vehicles, such as rough terrain vehicles especially suitable for logging operations and the like. More particularly, this invention pertains to a cradle mounting assembly for the front axle of a rough terrain vehicle.

2. Description of the Prior Art

In a rough terrain vehicle of the prior art the cradle mounting assembly comprised bearing blocks carried on the frame to receive the bushings. In many cases, these blocks were line-bored to assure that the bearings supporting the cradle assembly would be axially aligned when the cradle assembly mounted in place on the frame. Although a spherical bushing having metal-to-metal contact could be used in a cradle assembly having the bearing blocks individually bored and welded in place without exceeding the allowable machining tolerances for the mounting assembly, such bushings are particularly vulnerable to environmental excess in a rough terrain vehicle used in forestry operations. Metal-on-metal bushings for rough terrain vehicles require an extremely tight manufacturing tolerance to keep the joint clean, as well as constant greasing in an effort to preserve the life of the seals and the bushing. The constant exposure of the joint to mud and grime permits grit to work into the joint and act as a grinding compound thereon. Further, the steel-to-steel contact in the old design tended to pound out the bore of the cradle assembly during operation. Also, the metal-on-metal contact provided by the prior art bushing transmitted all wheel and axle shock loads directly to the main chassis.

The cradle mounting assembly of the present invention eliminates the need for line boring of cradle mounting blocks required in the prior assembly. Coupling means provided between the cradle and a spherical bearing carried in each of the mounting blocks assures alignment of the cradle assembly without expensive line-boring procedures.

Further, the elastomeric bearing provided between the inner and outer races of the bushing protects the joint from the environmental effects of dirt and grime encountered under normal operation conditions.

Further, the mounting block assembly of the present invention enables the bushing to be readily removed from the frame, permitting simple replacement of the cradle assembly.

Under load, the elastomeric interface of the spherical bushing of the present invention provides a progressively higher resistance moment as cradle movement is increased relative to the front frame. The capability of the bushing to dampen such forces exerted under combined loading theoretically eliminates the need for axial thrust washers between the cradle and the front frame and the need for frame stops to stop oscillatory movement of the cradle relative to the front frame. In practice, impact forces between the cradle and the stops are lessened. Further, the intent of the improved design is to assure that each bearing shares the input loads equally to stabilize the vehicle about its longitudinal axis.

Although spherical rubber bushings have been employed in other applications, such bushings have not been used in combination with the connecting means of a cradle mounting assembly. Further, such applications neither solve nor make obvious the solution provided by the present invention. For example, in U.S. Pat. No. 2,305,880 — Leighton, issued Dec. 22, 1942 and entitled "Oscillatory Connection", the spherical rubber bushing is employed in a steering linkage requiring oscillatory parts. However, such linkage offers no solution to the combined alignment and oscillatory problem found in the present cradle mounting assembly. In U.S. Pat. No. 2,996,308 — Cislo, issued Aug. 15, 1961 and entitled "Self-Aligning Suspension Control Arm Bearing Assembly", a pivot shaft threaded at opposite ends is received in respective spherical bushings. Although the Cislo patent also shows a spherical bushing, it, too, fails to solve the combined oscillation and alignment problem of the prior design and such assembly does not teach or suggest the cradle mounting assembly of the present invention.

Further, neither of the above-noted patents suggest a mounting assembly suitable for a power-driven axle.

SUMMARY OF THE INVENTION

In accordance with the present invention, a cradle mounting assembly is provided for the front frame of an articulated rough terrain vehicle for forestry applications. Provided beneath the frame is an open space for receiving the cradle assembly supporting the power-driven front axle of the vehicle. At opposite ends of said space, are provided mounting blocks for securing the cradle assembly in place. Each mounting block has a cylindrical core which receives a bushing, the block split for easy installation of the bushings, with bolts provided to secure each block and its associated bushing in assembled relation. The spherical bushing received in each of the mounting blocks includes an elastomeric material bonded between the inner race and the outer race of the bushing. The cradle for the front axle is pinned to the frame at each bushing location with a pin having a relatively straight end portion and a frusto-conical end portion opposite the straight end portion. The straight end portion of the pin passes through the inner race of the bushing to be secured in place by a bolt and a thrust washer at the outer end thereof. The frusto-conical or inner end portion of the pin is received in a corresponding bore in the cradle, with a bolt and a thrust washer combination being secured to the inner end of the pin, the bolt being threaded into the inner end of the pin to secure the cradle to the frame.

The combination of pin and bushing assures relative alignment of the cradle assembly with respective front and rear mounting blocks without the requirement of an in-line bore for both mounting blocks.

The elastomeric layer provided between the respective inner and outer races of each bushing effectively seals each bushing from contamination.

Further, the elastomeric material provided in the bushing provides a progressively higher resistance moment (progressive spring rate) as cradle movement is increased relative to the front frame. Combined axial and torsional forces transmitted to the frame through the cradle are dampened by the elastomeric interface of the bushing and the longitudinal or "roll" stability of the vehicle is improved.

These and other advantages will be readily apparent to one skilled in the art upon reading the foregoing specification when considered in conjunction with the drawings described below.

DETAILED DESCRIPTION OF PREFERRED EMBODIMENT

Figure 1:
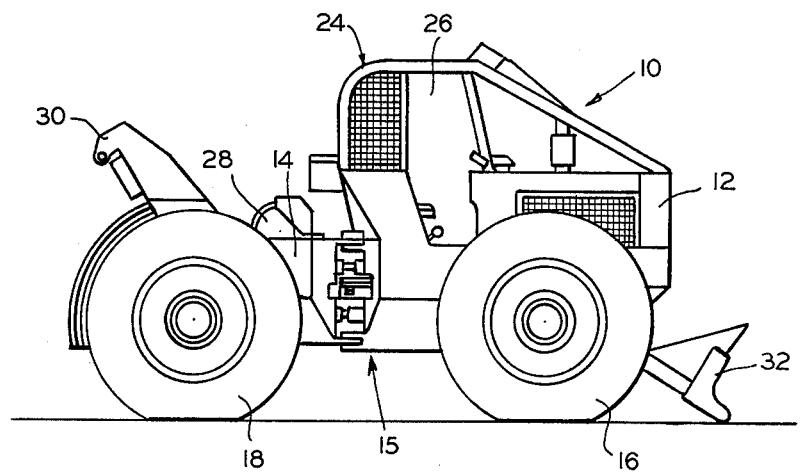
FIG. 1 is a side elevational view of an articulated skidder vehicle which employs the cradle mounting assembly of the present invention.

A rough terrain articulated vehicle 10 for forestry applications comprises a front frame 12, a rear frame 14 and a joint 15 therebetween. Front wheels 16 and rear wheels 18 are independently mounted on respective front and rear axles 20 and 22. A cab 24 is provided on the front portion of the vehicle enclosing an operator's compartment 26. A winch 28 provided on the rear of the vehicle extends a cable (not shown) over a fairlead assembly 30, the cable being used to secure and draw up cut logs or trees. A decking blade 32 is provided at the front end of the front frame 12 for stacking or shifting logs.

Figure 2:
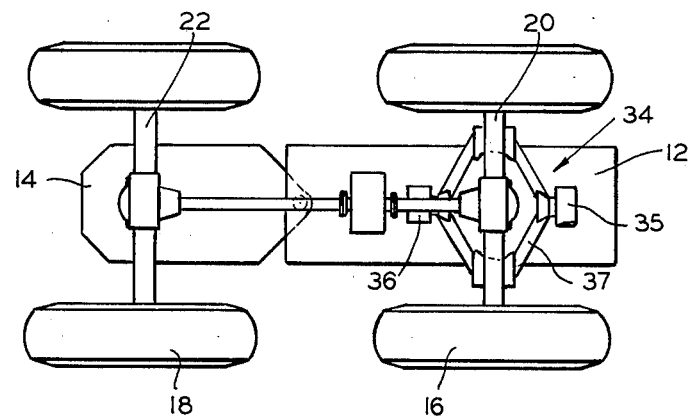
FIG. 2 is a schematic view of the vehicle of FIG. 1 from the bottom, showing the cradle mounting assembly for the powerdriven front axle mounted in place.
Figure 3:
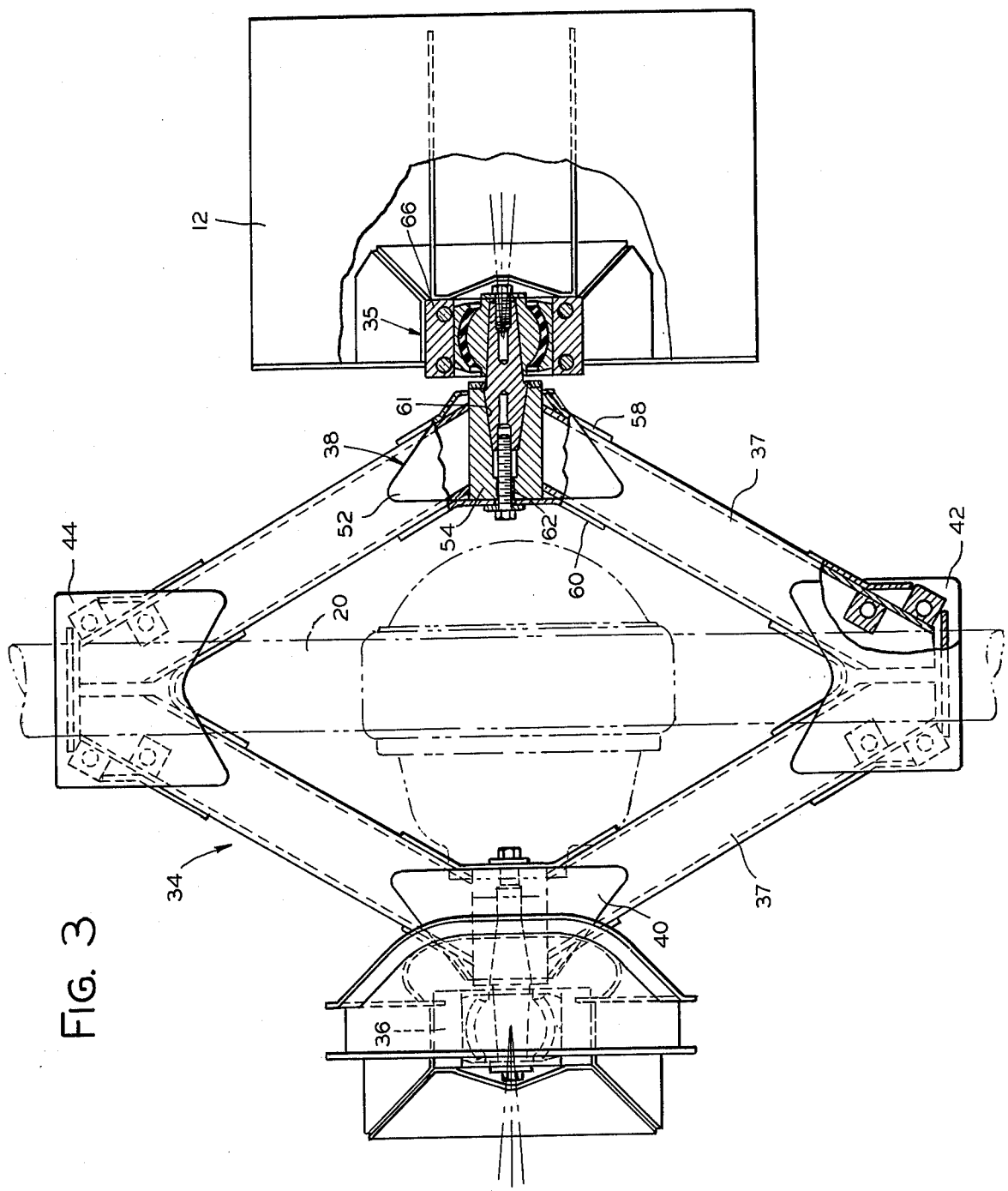
FIG. 3 is a detail plan view showing the cradle mounting assembly of FIG. 2 with portions thereof removed for clarity.
Figure 4:
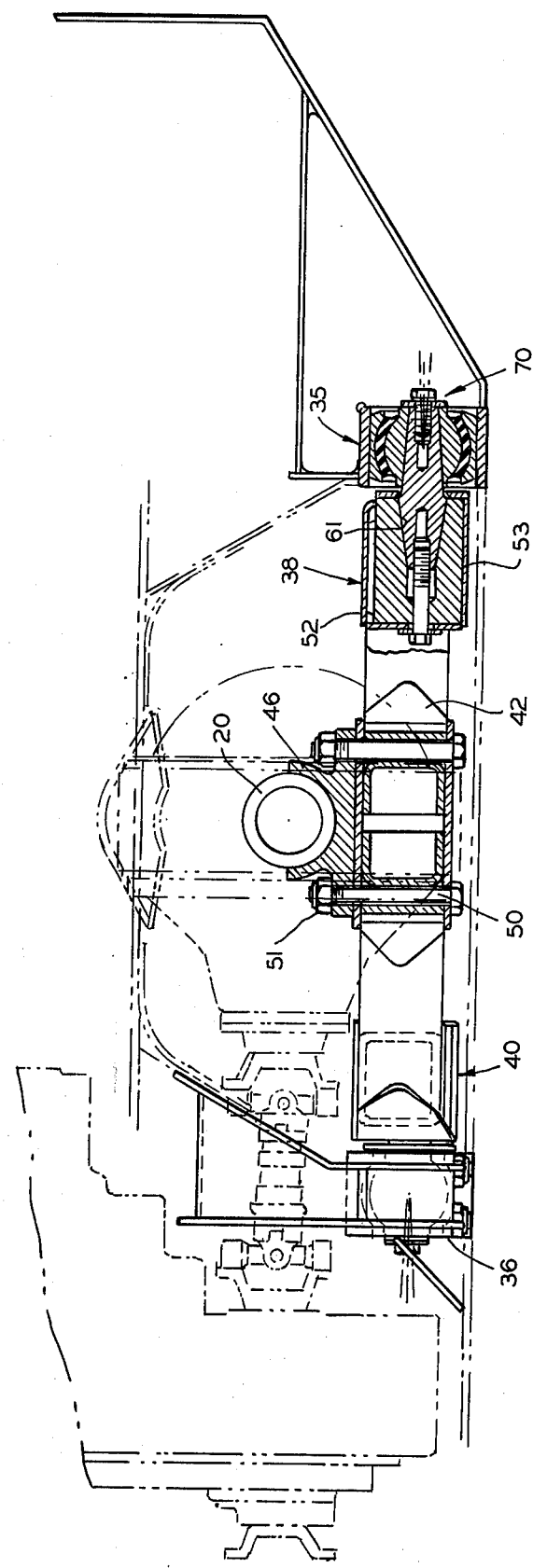
FIG. 4 is a side elevational view of the cradle mounting assembly shown in FIG. 3.
Figure 5:
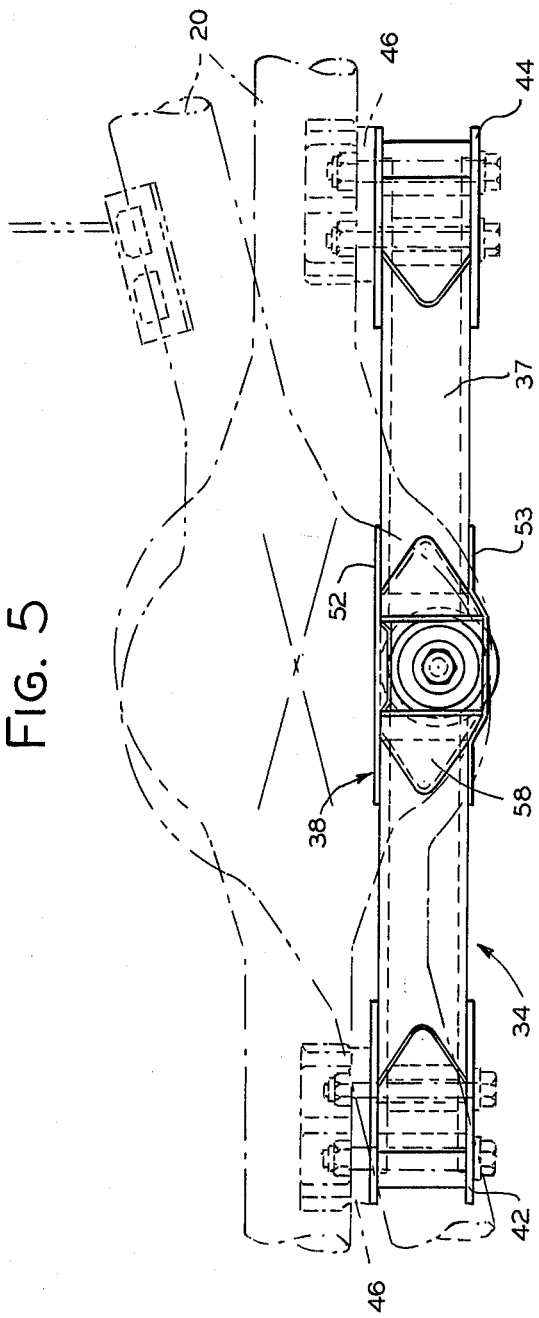
FIG. 5 is a front elevational view of the cradle mounting assembly shown in FIG. 3, with the front axle of the vehicle superimposed thereon in phantom to show the angular displacement of the axle under operating conditions.

As seen in FIG. 2, the power-driven front axle 20 of the vehicle 10 is mounted on a cradle assembly 34, the cradle assembly 34 being secured to the front frame 12 by means of front and rear mounting blocks 35 and 36. The rear axle 22 is directly coupled to the rear frame 14. The cradle assembly 34 comprises interconnected front and rear pairs of cross beams 37 (FIG. 3). The cross beams 37 are joined to form a diamond-shaped configuration, with the respective front ends of the front pair of cross beams 37 joined at a front cradle mounting member 38 and the respective rear ends of the rear pair of cross beams 37 joined at a rear cradle mounting member 40. Respective front and rear pairs of cross beams 37 are secured to axle mounting pads 42 and 44 at a mid portion of the cradle assembly 34.

The front axle 20 is secured to the cradle 34 by axle supports 46 which are mounted at opposite ends of the axle housing. The axle supports 46 overlie corresponding mounting pads 42 and 44 provided on the cradle 34. Mutually aligned openings in the axle supports 46 and the axle mounting pads 42 and 44 receive bolts 50 which are engaged by corresponding nuts 51 to secure the front axle 20 and the cradle 34 in assembled relation.

Figure 7:
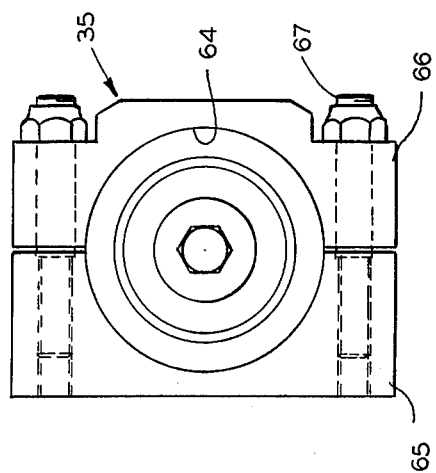
FIG. 7 is a side elevational view of the cradle mounting assembly of FIG. 6 in assembled relation.

Since the cradle mounting pads 38,40 are similarly constructed and symmetrically disposed at opposite ends of the cradle 34, only one of the mounting pads will be described in detail. The cradle mounting pad 38 comprises respective upper and lower plates 52 and 53 mounted on top and bottom surfaces of the juncture of the front rails 37 of the cradle 34. A mounting member 54 is disposed between the front rails 37 of the cradle 34 and welded in place. Additionally, front and rear reinforcing plates 58 and 60 are welded to either side of the joint between the mounting member 54 and the front rails 37 to reinforce that joint. The mounting member 54 has a frusto-conical bore 61 at a forward end thereof aligned with an opening provided in the plate 58 and a straight bore 62 concentric therewith passing through the rear end of the member 54 and aligned with an opening in the rear plate 60. The front mounting block 35 provided in the front frame 12 comprises a symmetric block having a central core 64 (FIG. 7), the block split at a horizontal mid-line to provide a base 65 mounted on the frame and a detachable cap 66 having fastening means 67 securing the halves 65,66 of the block 35 together.

Figure 6:
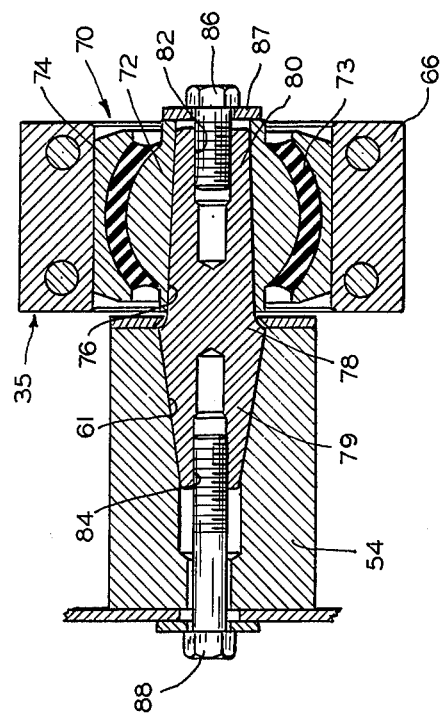
FIG. 6 is an enlarged detail view of the connection between the front frame and the cradle mount for the front axle with portions thereof removed for clarity.

Referring now to FIG. 6, the connection between the cradle and the frame includes a spherical bushing 70 which seats in the base 65 of the mounting block 35. The spherical bushing 70 comprises an inner race 72 having bonded thereto a layer of an elastomeric material 73. The spherical inner race 72 of the bushing 70 is seated in the outer race 74 with the opposite side of the elastomeric material 73 bonded thereto. A tapered opening 76 in the inner race 72 receives the front portion of a mounting pin 78 which has a frusto-conical rear portion 79 and a slightly tapered front portion 80. The mounting pin, or cradle support member, 78 has tapped holes 82 and 84 at opposite ends thereof. A bolt 86 having a thrust washer 87 mounted thereon is received in the opening 82 to secure the pin 78 to the bushing 70. The opposite end 79 of the pin 78 is inserted into the bore 61 in the mounting member 54 provided on the cradle 34. A bolt 88 passes through the opening in the plate 60 and the straight bore 62 in the member 54 to enter the frusto-conical end 79 of the pin 78 to secure the front bushing 70 to the cradle 34. The rear bushing 70 is similarly secured to the cradle 34. Front and rear bushings 70 are fastened in respective mounting blocks 35 and 36 to complete the coupling of the cradle mounting assembly 34 to the front frame 12. The front and rear bushings 70 equally support the weight of the cradle 34. The cradle assembly 34 with associated bearings 70 seated in respective bases 65 of mounting blocks 35 and 36 may be biased axially or angularly prior to fastening the caps 66 in place to put an axial, a torsional or a combined preload on the completed assembly.

The elastomeric interface 73 of the bushing 70, bonded respectively to the inner race 72 and the outer race 74 thereof, provides a progressive spring rate, that is, an increased resistance moment, as relative movement between the cradle mounting assembly 34 and the frame 12 is increased. In addition the elastomeric material 73 could be compressively preloaded to further limit relative movement between the axle and the frame. Thus, the forces transmitted from the axle to the frame under torsional, axial or combined loadings are substantially reduced by the elastomeric interface 73 of the bushing 70. Further, the elastomeric material 73 provided between the inner race 73 and the outer race 74 of the bushing 70 effectively seals that joint against environmental contamination.

A simple mounting assembly has been provided for the cradle mounting means for the axle of a vehicle, the assembly having substantially improved resistance to environmental contaminants Further, the assembly employed, including the frusto-conical pin-and-socket connection between the cradle and the frame, substantially reduces alignment problems associated with the manufacture of the mounting assembly. In addition, axial and torsional loads received by the axle are substantially dampened by the mounting means, thus lessening the impact of such loads transmitted to the frame. Further, side-to-side oscillation of the axle is reduced, which tends to stabilize the vehicle by keeping all four wheels on the ground.

While only a single embodiment of the invention has been described in detail, it will be understood that the detailed description is intended to be illustrative only and that various modifications and changes may be made in the invention without departing from the scope of same. Therefore, the limits of the invention should be determined from the appended claims.

I claim:

1. A cradle mounting assembly for securing a cradle-supported axle to the frame of a vehicle comprising mutually aligned, laterally spaced, mounting blocks provided at opposite ends of a frame member of the vehicle for receiving the cradle assembly, cradle support members disposed between the cradle assembly and the mounting blocks to support the cradle assembly and the axle rigidly secured thereto, bearings disposed on the cradle support members at opposite ends of the cradle assembly, each of the bearings engageable in respective mounting blocks of the mounting assembly to permit oscillatory movement of the cradle assembly with respect to the frame, each bearing including an outer race having an outer surface engageable with the mounting blocks to be rigidly held in place therein, an inner race movable with respect to the outer race and the mounting blocks so as to permit the cradle assembly to oscillate with respect to the frame to assure that the wheels of the vehicle maintain ground contact at all times during normal operation, and compressible means disposed between the respective bearing surfaces of the inner and outer race of each bearing to stabilize the vehicle by providing a progressive spring rate for the assembly as relative movement between the cradle and the frame increases to absorb energy under impact loading and to prevent contamination of bearing surfaces.

2. A cradle mounting assembly as claimed in claim 1 where the compressible means between the inner race and the outer race of each bearing is pre-stressed to limit oscillation therebetween under load.

3. A cradle assembly as claimed in claim 1 wherein the outer race of each bearing includes a concave bearing surface, the inner race comprises a spherical bearing surface complementary to the concave bearing surface of the outer race, and an elastomeric interface is bonded to respective inner and outer races of the bearing.

4. A cradle assembly as claimed in claim 1 wherein each bearing comprises a spherical bushing carried in a mounting block secured to the frame, each cradle support member comprises a head portion and a shaft portion and the spherical bushing includes an inner race having a central core for receiving the head portion of the cradle support member, means for securing the cradle support member to the inner race of the bushing, a shaft portion of the cradle support member being received in a complementary bore provided in an end portion of the cradle of the cradle mounting assembly, and means for securing the shaft of the cradle support member to the cradle.

5. A cradle mounting assembly as claimed in claim 4 wherein the shaft portion of the cradle support member is of frusto-conical configuration and the bore provided in the end portion of the cradle is complementary thereto, such that alignment between the cradle and respective cradle support members is readily effected.

6. A bearing for the cradle mounting assembly of a vehicle comprising a spherical bushing having an inner race and an outer race, an elastomeric interface bonded therebetween, the elastomeric interface being pre-stressed to limit oscillation between the inner race and the outer race, and the inner race of the bushing including an outwardly extending shaft portion complementary to a bore provided in the cradle, for mounting the cradle and the bushing in assembled relation.

* * * * *